(12) United States Patent
Aoki et al.

(10) Patent No.: US 11,676,744 B2
(45) Date of Patent: Jun. 13, 2023

(54) THERMISTOR ELEMENT AND ELECTROMAGNETIC WAVE SENSOR

(71) Applicant: TDK CORPORATION, Tokyo (JP)

(72) Inventors: Susumu Aoki, Tokyo (JP); Shinji Hara, Tokyo (JP); Naoki Ohta, Tokyo (JP); Maiko Shirokawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/669,755

(22) Filed: Feb. 11, 2022

(65) Prior Publication Data

US 2022/0262548 A1 Aug. 18, 2022

(30) Foreign Application Priority Data

Feb. 18, 2021 (JP) .............................. JP2021-024497
Nov. 1, 2021 (JP) .............................. JP2021-178767

(51) Int. Cl.
*H01C 7/00* (2006.01)
*G01J 5/20* (2006.01)
*H01C 1/14* (2006.01)
*G01J 5/00* (2022.01)

(52) U.S. Cl.
CPC ................ *H01C 7/008* (2013.01); *G01J 5/20* (2013.01); *H01C 1/14* (2013.01); *G01J 2005/0077* (2013.01); *G01J 2005/202* (2013.01)

(58) Field of Classification Search
CPC .. H01C 7/008; H01C 7/06; G01K 7/16; G01J 5/20
See application file for complete search history.

(56) References Cited

U.S. PATENT DOCUMENTS

| | | | |
|---|---|---|---|
| 5,021,663 A | 6/1991 | Hornbeck | |
| 8,629,398 B2* | 1/2014 | Talghader | G01J 5/0853 |
| | | | 250/340 |
| 9,494,469 B2* | 11/2016 | Yon | G01N 21/3504 |
| 10,854,523 B2* | 12/2020 | Nishizawa | H01L 23/552 |
| 2004/0089807 A1* | 5/2004 | Wada | G01J 5/20 |
| | | | 250/338.1 |
| 2020/0408604 A1 | 12/2020 | Ohta et al. | |

FOREIGN PATENT DOCUMENTS

JP 2012-156274 A 8/2012
WO 2019/171488 A1 9/2019

OTHER PUBLICATIONS

Jul. 7, 2022 Search Report issued in European Patent Application No. 22156776.1.

* cited by examiner

*Primary Examiner* — Kyung S Lee
(74) *Attorney, Agent, or Firm* — Oliff PLC

(57) ABSTRACT

A thermistor element includes: a thermistor film; a pair of first electrodes in contact with one surface of the thermistor film; an insulation film opposite to a contact side of the pair of first electrodes, the contact side on which the pair of first electrodes is in contact with the thermistor film; and at least one opening portion located in a region which overlaps each of the first electrodes when viewed in a plan view and passing through the insulation film. Each first electrode has a first portion located where each of the first electrodes and the opening portion overlap when viewed in a plan view and a second portion outside of where each of the first electrodes and the opening portion overlap when viewed in a plan view and is over the first portion and second portion to be in contact with the one surface of the thermistor film.

14 Claims, 10 Drawing Sheets

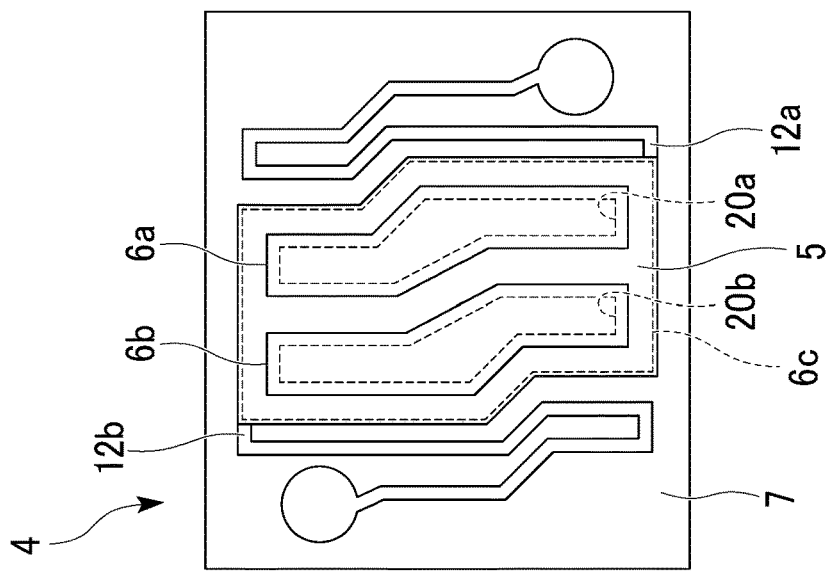
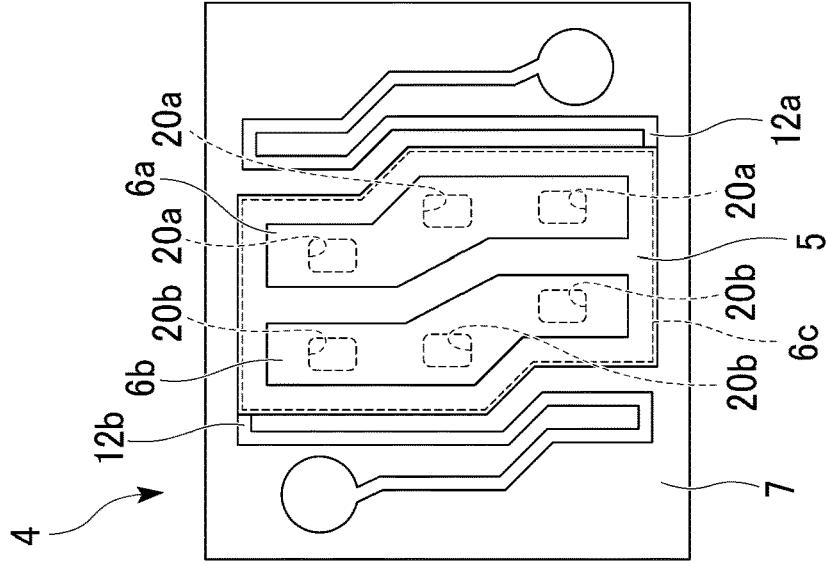
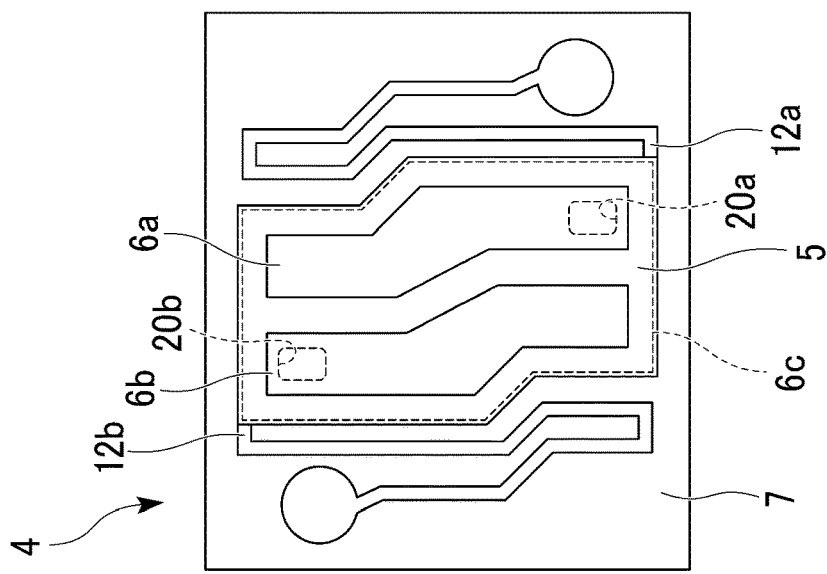

THERMISTOR ELEMENT AND ELECTROMAGNETIC WAVE SENSOR

CROSS-REFERENCE TO RELATED APPLICATION

Priority is claimed on Japanese Patent Application No. 2021-024497, filed Feb. 18, 2021, Japanese Patent Application No. 2021-178767, filed Nov. 1, 2021, the content of which is incorporated herein by reference.

BACKGROUND

The present disclosure relates to a thermistor element and an electromagnetic wave sensor.

For example, there are temperature sensors using a thermistor element (for example, refer to Patent Document 1 which will be described later). Furthermore, there are electromagnetic wave sensors using a thermistor element (for example, refer to Patent Document 2 which will be described later).

The electrical resistance of a thermistor film included in a thermistor element changes in accordance with a change in temperature of the thermistor film. In an electromagnetic wave sensor, a temperature of a thermistor film changes when infrared rays (electromagnetic waves) incident on the thermistor film are absorbed by the thermistor film or a material around the thermistor film. Thus, the thermistor element detects infrared rays (electromagnetic waves).

Here, according to the Stefan-Boltzmann's law, there is a correlation between a temperature of a measurement target and the infrared rays (radiant heat) emitted from the measurement target through thermal radiation. Therefore, when the infrared rays emitted from the measurement target are detected using the thermistor element, it is possible to measure a temperature of the measurement target in a non-contact manner.

Also, such thermistor elements are applied to electromagnetic wave sensors such as infrared imaging elements (infrared image sensors) which two-dimensionally detect (image) a temperature distribution of a measurement target by a plurality of thermistor elements arranged in an array form.

Patent Documents

[Patent Document 1] Japanese Unexamined Patent Application, First Publication No. 2012-156274
[Patent Document 2] PCT International Publication No. WO2019/171488

SUMMARY

Incidentally, an element structure of the thermistor element described above includes a current-in-plane (CIP) structure in which an electric current flows in an in-plane direction of a thermistor film and a current-perpendicular-to-plane (CPP) structure in which an electric current flows in a direction perpendicular to the plane of the thermistor film.

Of these, in the CIP structure, a resistance value of the thermistor film is high. On the other hand, in the CPP structure, the resistance of the thermistor film can be made lower compared with that of the CIP structure.

However, for example, in the thermistor element described in Patent Document 1 described above, an electrode comes into contact with the thermistor film through an opening portion passing through an insulating film. In this case, a sufficient contact area cannot be secured between the electrode and the thermistor film and there is a problem in terms of reliability.

It is desirable to provide a thermistor element in which a contact area between an electrode and a thermistor film can be increased and an electromagnetic wave sensor in which reliability can be increased by providing such a thermistor element.

The present disclosure provides the following means.
A thermistor element including:
a thermistor film;
a pair of first electrodes provided in contact with one surface of the thermistor film;
an insulation film positioned in a location opposite to a contact side of the pair of first electrodes, the contact side being a side on which the pair of first electrodes is in contact with the thermistor film; and
at least one opening portion located in a region which overlaps each of the first electrodes when viewed in a plan view and passing through the insulation film,
wherein each of the first electrodes has a first portion located in a region in which each of the first electrodes and the opening portion overlap when viewed in a plan view and a second portion located outside of the region in which each of the first electrodes and the opening portion overlap when viewed in a plan view, and
is provided over the first portion and the second portion to be in contact with the one surface of the thermistor film.

An electromagnetic wave sensor including: the thermistor element described above.

According to the present disclosure, it is possible to provide a thermistor element in which a contact area between an electrode and a thermistor film can be increased and an electromagnetic wave sensor in which reliability can be increased by providing such a thermistor element.

BRIEF DESCRIPTION OF THE DRAWINGS

FIGS. 6A to 6C are plan views showing a modified example of an opening portion.

DETAILED DESCRIPTION

Figure 1:
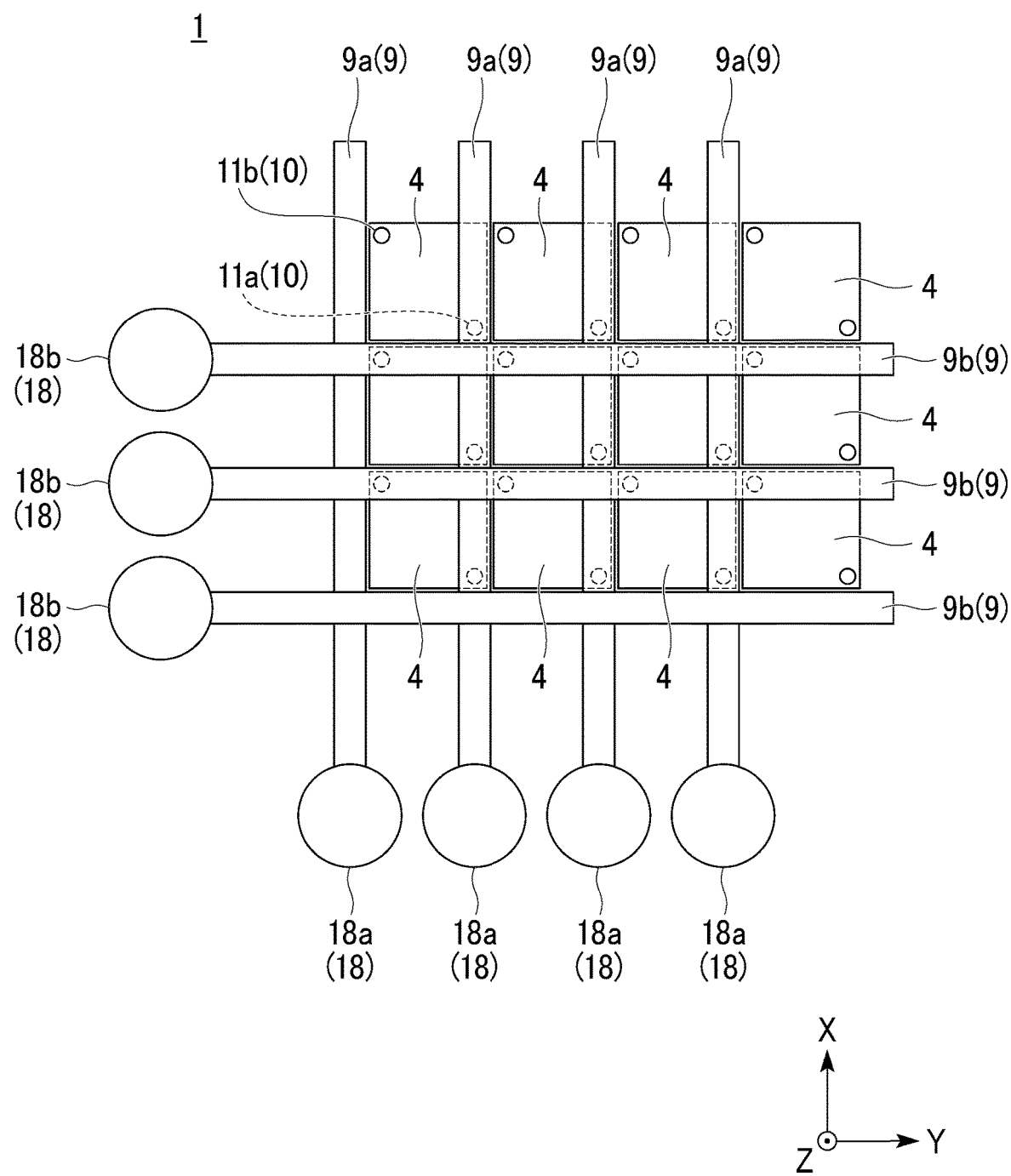
FIG. 1 is a plan view showing a constitution of an electromagnetic wave sensor according to an embodiment of the present disclosure.

Embodiments of the present disclosure will be described in detail below with reference to the drawings.

It is assumed that, in the drawings used in the following description, in order to make constituent elements easier to see, the scales of dimensions may differ in accordance with the constituent elements and the dimensional ratios or the like of the constituent elements are not always the same as actual ratios. Furthermore, the materials and the like exemplified in the following description are examples, the present disclosure is not necessarily limited thereto, and the present disclosure can be appropriately modified and carried out without changing the gist of the present disclosure.

Also, in the drawings which will be described later, an XYZ Cartesian coordinate system is set, an X-axis direction is assumed as a first direction X in a specific plane of an electromagnetic wave sensor, a Y-axis direction is assumed as a second direction Y orthogonal to the first direction X in the specific plane of the electromagnetic wave sensor, and a Z-axis direction is assumed as a third direction Z orthogonal to a specific plane of the electromagnetic wave sensor.

[Electromagnetic Wave Sensor]

First, as an embodiment of the present disclosure, for example, an electromagnetic wave sensor 1 shown in FIGS. 1 to 3 will be described.

FIG. 1 is a plan view showing a constitution of the electromagnetic wave sensor 1. FIG. 2 is an exploded perspective view showing the constitution of the electromagnetic wave sensor 1. FIG. 3 is a cross-sectional view showing the constitution of the electromagnetic wave sensor 1.

The electromagnetic wave sensor 1 in the embodiment is obtained by applying the present disclosure to infrared imaging elements (infrared image sensors) which two-dimensionally detect (image) a temperature distribution of a measurement target by detecting infrared rays (electromagnetic waves) emitted from the measurement target.

Infrared rays are electromagnetic waves having a wavelength of 0.75 μm or more and 1000 μm or less. Infrared image sensors are used as infrared cameras for indoor and outdoor night vision or the like and as non-contact temperature sensors for measuring temperatures or the like of people and objects.

Figure 2:
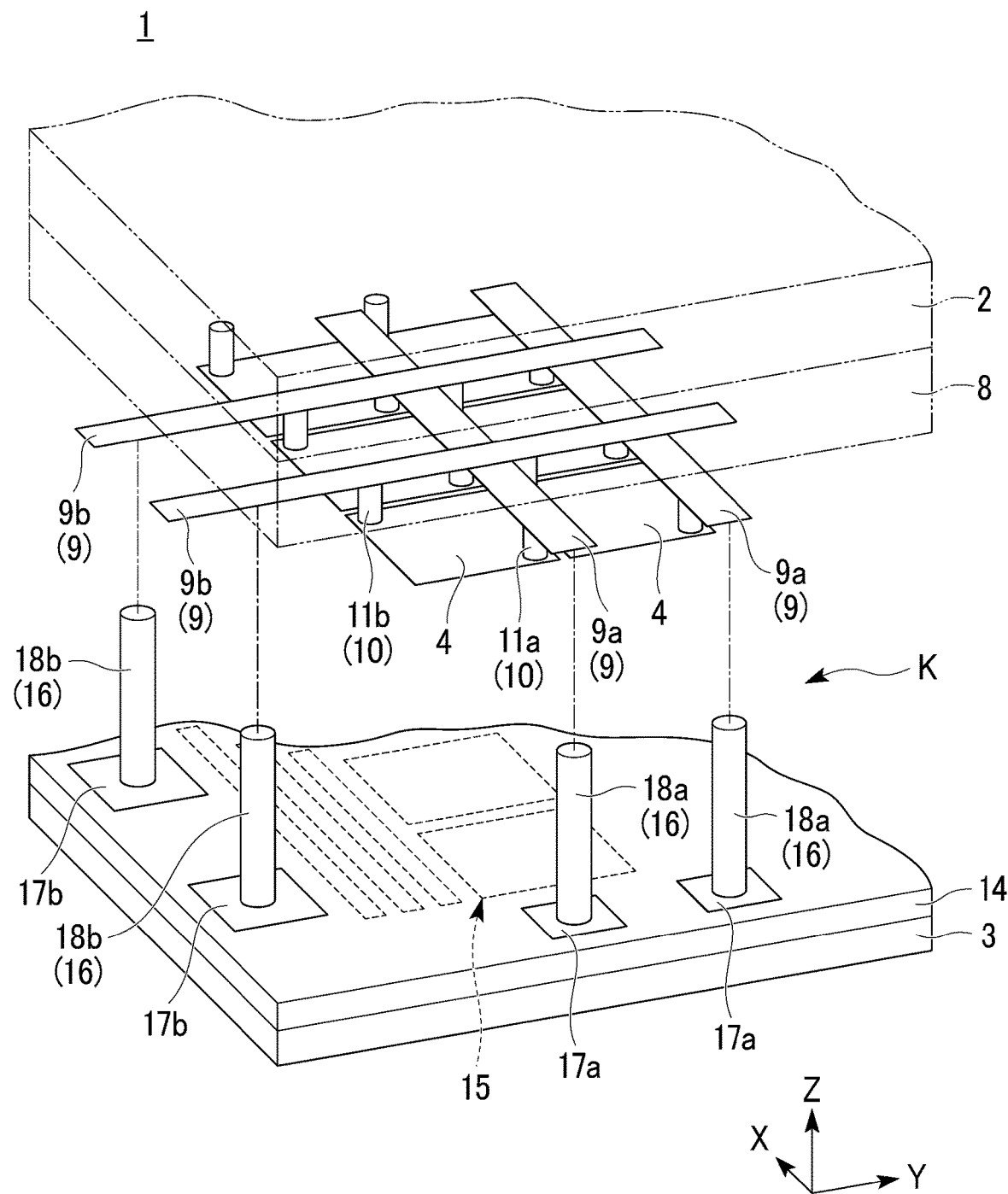
FIG. 2 is an exploded perspective view showing the constitution of the electromagnetic wave sensor shown in FIG. 1.
Figure 3:
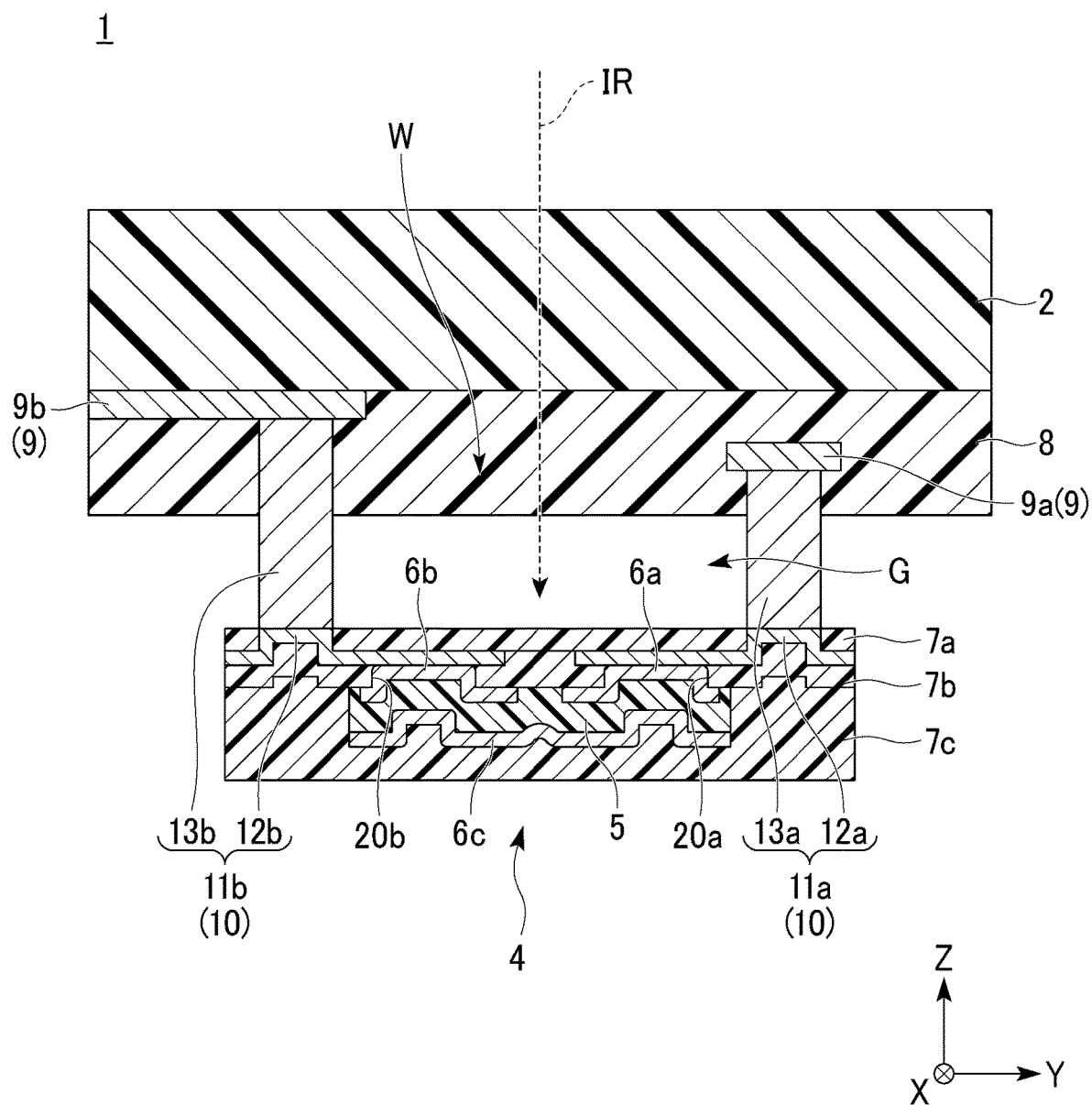
FIG. 3 is a cross-sectional view showing the constitution of the electromagnetic wave sensor shown in FIG. 1.

To be specific, as shown in FIGS. 1 to 3, the electromagnetic wave sensor 1 includes a first substrate 2 and a second substrate 3 disposed to face each other and a plurality of thermistor elements 4 disposed between the first substrate 2 and the second substrate 3.

The first substrate 2 and the second substrate 3 formed of a silicon substrate are transparent to electromagnetic waves of a specific wavelength (long-wavelength infrared rays having a wavelength of 8 to 14 μm in the embodiment) (hereinafter referred to as "infrared rays") IR. Furthermore, as a substrate transparent to infrared rays IR, a germanium substrate or the like can be used.

The first substrate 2 and the second substrate 3 form an internal space K closed between the first substrate 2 and the second substrate 3 by sealing the perimeter of the surfaces facing each other with a sealing material (not shown). Furthermore, the internal space K is reduced in pressure to a high vacuum. Thus, the electromagnetic wave sensor 1 minimizes an influence of heat due to convection in the internal space K and eliminates an influence of heat other that infrared rays IR emitted from a measurement target on the thermistor elements 4.

The electromagnetic wave sensor 1 in the embodiment is not necessarily limited to a constitution in which the closed internal space K described above is reduced in pressure and may have a constitution in which the internal space K closed or open at atmospheric pressure is provided.

The thermistor elements 4 includes a thermistor film 5 configured to detect infrared rays IR, a pair of first electrodes 6a and 6b provided in contact with one surface of the thermistor film 5, a second electrode 6c provided in contact with the other surface of the thermistor film 5, and insulation films 7a, 7b, and 7c configured to cover the thermistor film 5 and has a current-perpendicular-to-plane (CPP) structure in which an electric current flows in a direction perpendicular to the plane of the thermistor film 5. The insulation film 7b positioned in a location opposite to a contact side of the pair of first electrodes 6a and 6b, and the contact side is a side on which the pair of first electrodes 6a and 6b is in contact with the thermistor film 5 via the one surface.

That is to say, in the thermistor elements 4, an electric current can flow in the direction perpendicular to the plane of the thermistor film 5 from one first electrode 6a of the first electrodes toward the second electrode 6c and an electric current can flow in the direction perpendicular to the plane of the thermistor film 5 from the second electrode 6c toward the other first electrode 6b.

For the thermistor film 5, for example, vanadium oxide, amorphous silicon, polycrystalline silicon, an oxide with a spinel-type crystal structure containing manganese, titanium oxide, yttrium-barium-copper oxide, or the like can be used.

Examples of the first electrodes 6a and 6b and the second electrode 6c include conductive films such as those of platinum (Pt), gold (Au), palladium (Pd), ruthenium (Ru), silver (Ag), rhodium (Rh), iridium (Ir), and osmium (Os).

Examples of the insulation films 7a, 7b, and 7c include aluminum nitride, silicon nitride, aluminum oxide, silicon oxide, magnesium oxide, tantalum oxide, niobium oxide, hafnium oxide, zirconium oxide, germanium oxide, yttrium oxide, tungsten oxide, bismuth oxide, calcium oxide, aluminum oxynitride, silicon oxynitride, magnesium aluminum oxide, silicon boride, boron nitride, sialon (oxynitride of silicon and aluminum), and the like.

The insulation films 7a, 7b, and 7c may be constituted to cover at least a part of the thermistor film 5. In the embodiment, the insulation films 7a, 7b, and 7c are provided to cover both surfaces of the thermistor film 5.

The plurality of thermistor elements 4 are formed to have the same size as each other when viewed in a plan view. Furthermore, the plurality of thermistor elements 4 are disposed in an array form in a plane parallel to the first substrate 2 and the second substrate 3 (hereinafter referred to as a "specific in-plane"). That is to say, the plurality of thermistor elements 4 are disposed side by side in a matrix form in the first direction X and the second direction Y which intersect each other (orthogonally in the embodiment) in the specific in-plane.

Also, the thermistor elements 4 are disposed side by side at regular intervals in the first direction X and at regular intervals in the second direction Y assuming that the first direction X is set as a row direction and the second direction y is set as a column direction.

Although examples of the number of elements in the matrix of the thermistor elements 4 includes 640 rows×480 columns, 1024 rows×768 columns, and the like, the present disclosure is not necessarily limited thereto and the number of matrix elements can be changed as appropriate.

A first insulator layer 8, a wiring portion 9 electrically connected to a circuit portion 15 which will be described later, and a first connection portion 10 configured to electrically connect between each of the thermistor elements 4 and the wiring portion 9 are provided on the first substrate 2 side.

The first insulator layer 8 is formed of an insulation film laminated on one surface (surface facing the second substrate 3) of the first substrate 2. Examples of the insulation film include aluminum nitride, silicon nitride, aluminum oxide, silicon oxide, magnesium oxide, tantalum oxide, niobium oxide, hafnium oxide, zirconium oxide, germanium oxide, yttrium oxide, tungsten oxide, bismuth oxide, calcium oxide, aluminum oxynitride, silicon oxynitride, magnesium aluminum oxide, silicon boride, boron nitride, sialon (oxynitride of silicon and aluminum), and the like.

The wiring portion 9 has a plurality of first lead wirings 9a and a plurality of second lead wirings 9b. The first lead wirings 9a and the second lead wirings 9b are formed of, for example, a conductive film such as copper or gold.

The plurality of first lead wirings 9a and the plurality of second lead wirings 9b are located in different layers in the third direction Z of the first insulator layer 8 and are disposed to intersect three-dimensionally. Of these, the plurality of first lead wirings 9a extend in the first direction X and are provided side by side at regular intervals in the second direction Y. On the other hand, the plurality of second lead wirings 9b extend in the second direction Y and are provided side by side at regular intervals in the first direction X.

One of the thermistor elements 4 is provided for each of regions partitioned by the plurality of first lead wirings 9a and the plurality of second lead wirings 9b when viewed in a plan view. In a region facing each of the thermistor films 5 in the thickness direction of the first substrate 2 (a region which overlaps each of the thermistor films 5 when viewed in a plan view), a window portion W through which infrared rays IR are transmitted is present between the first substrate 2 and the thermistor film 5.

The first connection portion 10 has a pair of first connection members 11a and 11b provided to correspond to each of the plurality of thermistor elements 4. Furthermore, the pair of first connection members 11a and 11b have a pair of the arm portion 12a and 12b and a pair of leg portions 13a and 13b.

Each of the arm portions 12a and 12b is made of at least one selected from, for example, aluminum, tungsten, titanium, tantalum, titanium nitride, tantalum nitride, chromium nitride, and zirconium nitride. Each of the arm portions 12a and 12b is a wiring layer electrically connected to the first electrode 6a or the first electrode 6b and is formed of a bent linear conductor pattern formed along the perimeter of the thermistor film 5 when viewed in a plan view and a conductor portion formed at a position at which each of the arm portions 12a and 12b and the thermistor film 5 overlap when viewed in a plan view and connected to one first electrode 6a or the other first electrode 6b. Each of the leg portions 13a and 13b is formed of a conductor pillar with a circular cross section formed to extend in the third direction Z through plating of, for example, copper, gold, an FeCoNi alloy, a NiFe alloy (permalloy), or the like, as a contact plug electrically connected to the first lead wirings 9a or the second lead wirings 9b.

One 11a of the first connection members has one 12a of the arm portions electrically connected to one 6a of the first electrodes and one 13a of the leg portions electrically connected between the one arm portion 12a and the first lead wiring 9a and electrically connects between the one first electrode 6a and the first lead wiring 9a.

The other 11b of the first connection members has the other 12b of the arm portions electrically connected to the other first electrode 6b and the other leg portion 13b electrically connected between the other arm portion 12c and the second lead wiring 9b and electrically connects between the other first electrode 6b and the second lead wiring 9b.

Thus, the thermistor element 4 is supported in a state of being suspended in the third direction Z by the pair of first connection members 11a and 11b located diagonally in the plane thereof. Furthermore, a space G is provided between the thermistor element 4 and the first insulator layer 8.

Although not shown, on one surface side (surface facing the second substrate 3) of the first substrate 2, a plurality of selection transistors (not shown) for selecting one thermistor element 4 from the plurality of thermistor elements 4 are provided. The plurality of selection transistors are provided at positions corresponding to the plurality of thermistor elements 4 of the first substrate 2. Furthermore, each of the selection transistors may be provided at a position in which the window portion W described above is avoided to prevent diffused reflection and deterioration in efficiency of incidence of infrared rays IR.

A second insulator layer 14, the circuit portion 15 configured to detect a change in voltage output from the thermistor element 4 and convert the detected change in voltage into a brightness temperature, and a second connection portion 16 configured to electrically connect between each of the thermistor elements 4 and the circuit portion 15 are provided on the second substrate 3 side.

The second insulator layer 14 is formed of an insulation film laminated on one surface (a surface facing the first substrate 2) side of the second substrate 3. As the insulation film, the same insulation films as those exemplified in the first insulator layer 8 described above can be used.

The circuit portion 15 includes a read out integrated circuit (ROIC), a regulator, an analog-to-digital (A/D) converter, a multiplexer, and the like and is provided in a layer which is the second insulator layer 14.

Also, a plurality of connection terminals 17a and 17b corresponding to the plurality of first lead wirings 9a and the plurality of second lead wirings 9b are provided on a surface of the second insulator layer 14. The connection terminals 17a and 17b are formed a conductive film made of, for example, copper or gold.

One 17a of the connection terminals is located in a region on one side in the first direction X surrounding the perimeter of the circuit portion 15 and the connection terminals are provided side by side at regular intervals in the second direction Y. The other 17b of the connection terminals is located in a region on one side in the second direction Y surrounding the perimeter of the circuit portion 15 and the connection terminals are provided side by side at regular intervals in the first direction X.

The second connection portion 16 has a plurality of second connection members 18a and 18b provided to correspond to the plurality of first lead wirings 9a and the plurality of second lead wirings 9b. The plurality of second connection members 18a and 18b are formed of conductor pillars having a circular cross section formed to extend in the third direction Z through plating of, for example, copper, gold, or the like.

One 18a of the second connection members electrically connects between one end side of the first lead wiring 9a and the one 17a of the connection terminals. The other 18b of the second connection members electrically connects between one end of the second lead wiring 9b and the other 17b of the connection terminals. Thus, electrical connection between the plurality of first lead wirings 9a and the circuit portion 15 is provided via one 18a of the second connection members and the one 17a of the connection terminals. Furthermore, electrical connection between the plurality of second lead wirings 9b and the circuit portion 15 is provided via the other 18b of the second connection members and the other 17b of the connection terminals.

In the electromagnetic wave sensor 1 in the embodiment having the constitution as described above, the infrared rays IR emitted from a measurement target are incident on the thermistor element 4 from the first substrate 2 through the window portion W.

In the thermistor element 4, when infrared rays IR incident on the insulation films 7a, 7b, and 7c formed in the vicinity of the thermistor film 5 are absorbed by the insulation films 7a, 7b, and 7c and the infrared rays IR incident on the thermistor film 5 are absorbed by the thermistor film 5, a temperature of the thermistor film 5 changes. Furthermore, in the thermistor element 4, when the electrical resistance of the thermistor film 5 changes in response to a change in temperature of the thermistor film 5, an output voltage between the pair of first electrodes 6a and 6b changes. In the electromagnetic wave sensor 1 in the embodiment, the thermistor element 4 functions as a bolometer element.

In the electromagnetic wave sensor 1 in the embodiment, when the infrared rays IR emitted from a measurement target are detected in a plane using the plurality of thermistor elements 4, and then an electrical signal (voltage signal) output from each of the thermistor elements 4 is converted into a brightness temperature, it is possible to detect (capture) a temperature distribution (temperature image) of the measurement target in two dimensions.

In the thermistor element 4, when a constant voltage is applied to the thermistor film 5, it is also possible to detect a change in current flowing through the thermistor film 5 in response to a change in temperature of the thermistor film 5 and convert the detected change into a brightness temperature.

[Thermistor Element]

For example, the thermistor elements 4 shown in FIGS. 4 and 5 will be described below as the embodiment of the present disclosure.

Figure 4:
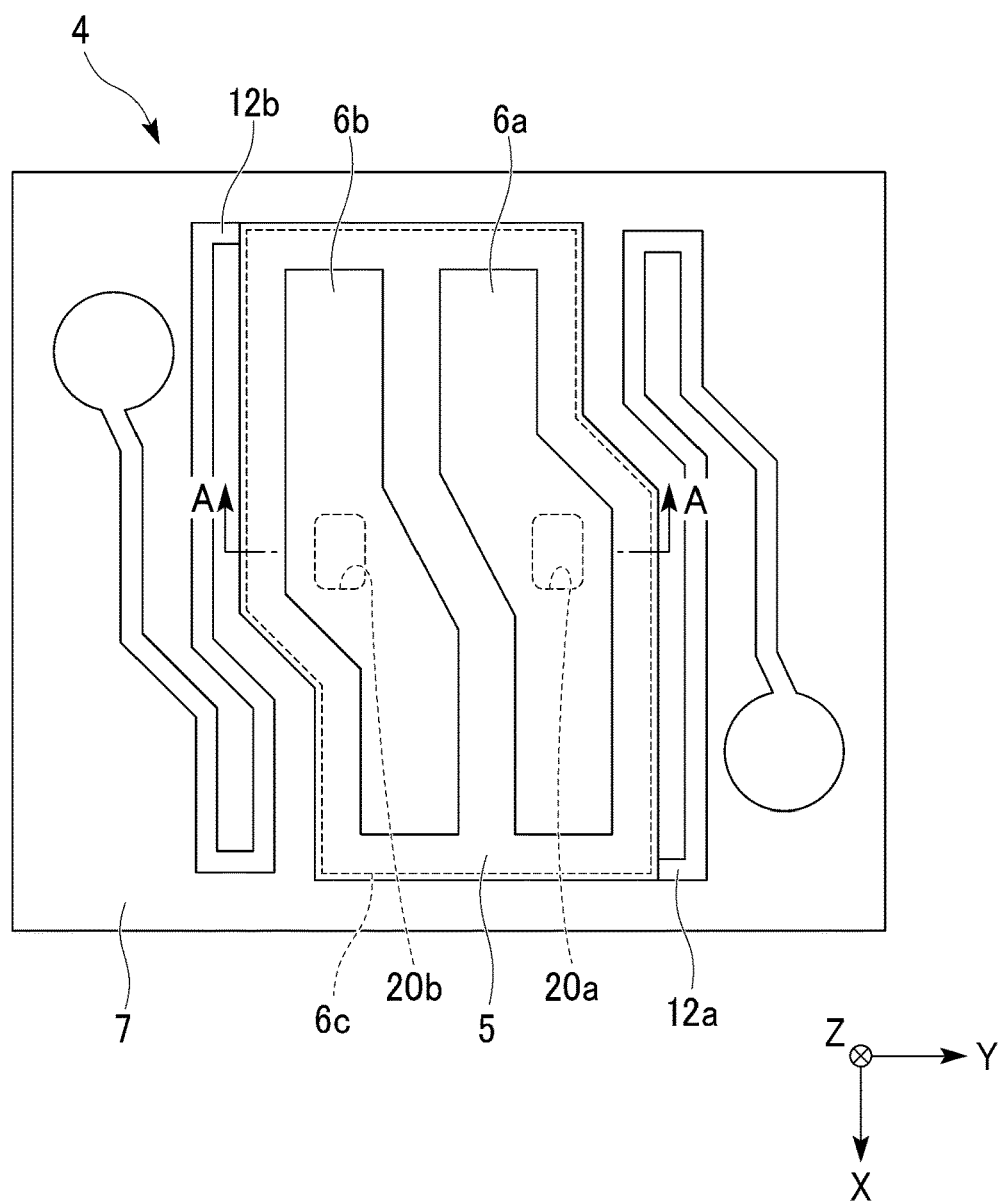
FIG. 4 is a plan view showing a constitution of a thermistor element included in the electromagnetic wave sensor.

FIG. 4 is a plan view showing a constitution of each of the thermistor elements 4. FIG. 5 is a cross-sectional view of the thermistor element 4 taken along line A-A shown in FIG. 4.

Figure 5:
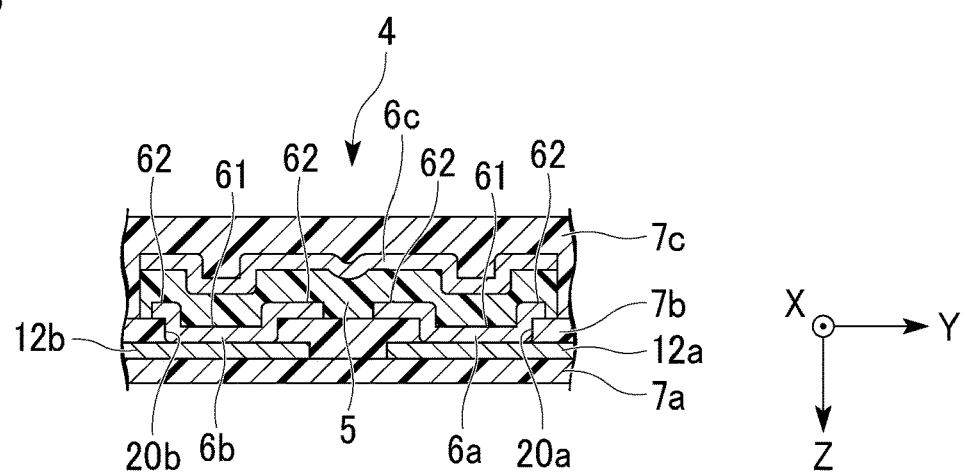
FIG. 5 is a cross-sectional view of the thermistor element taken along line A-A shown in FIG. 4.

As shown in FIGS. 4 and 5, each of the thermistor elements 4 in the embodiment has a CPP structure in which the thermistor film 5, the pair of first electrodes 6a and 6b provided in contact with one surface (lower surface in FIG. 5) of the thermistor film 5, and the second electrode 6c provided in contact with the other surface (upper surface in FIG. 5) of the thermistor film 5 are provided.

In the thermistor element 4 in the embodiment, for example, an oxide having a spinel-type crystal structure in which cobalt, manganese, and nickel are contained (hereinafter referred to as "Co—Mn—Ni oxide") is used for the thermistor film 5 and platinum (Pt) is used for the first electrodes 6a and 6b and the second electrode 6c. The thermistor element 4 is an element called a negative temperature coefficient (NTC) whose electrical resistance decreases when a temperature rises.

In the thermistor element 4 in the embodiment having the constitution as described above, an electric current can flow from one 6a of the first electrodes toward the second electrode 6c in the direction perpendicular to the plane of the thermistor film 5 and an electric current can flow from the second electrode 6c toward the other 6b of the first electrodes in the direction perpendicular to the plane of the thermistor film 5.

A resistance value of the thermistor film 5 in the CPP structure depends on a thickness of the thermistor film 5 and a size of areas in which the first electrodes 6a and 6b face the second electrode 6c. Therefore, when the CPP structure described above is adopted, it is possible to reduce the resistance of the thermistor film 5.

Incidentally, in the thermistor element 4 in the embodiment, opening portions 20a and 20b each located in a region which overlaps each of first electrodes 6a and 6b when viewed in a plan view and passing through the insulation film 7b is provided. Each of the opening portions 20a and 20b is between the thermistor film 5 and the arm portions 12a, 12b which are wiring layers respectively. To be specific, in the embodiment, each of the rectangular opening portions 20a and 20b is provided at a substantial center portion in the region which overlaps each of the first electrodes 6a and 6b respectively when viewed in a plan view.

Each of the first electrodes 6a and 6b has a first portion 61 located in a region in which each of the first electrodes 6a and 6b and each of the opening portions 20a and 20b overlap respectively when viewed in a plan view and a second portion 62 located outside of a region in which each of the first electrodes 6a and 6b and each of the opening portions 20a and 20b overlap respectively when viewed in a plan view. In each of the first electrodes 6a and 6b, the first portion 61 and the second portion 62 are electrically connected. Thus, the first electrodes 6a and 6b are provided over the first portion 61 and the second portion 62 in contact with one surface of the thermistor film 5.

Thus, in the thermistor element 4 in the embodiment, it is possible to increase the contact areas between the first electrodes 6a and 6b and the thermistor film 5 and it is possible to improve the reliability of the thermistor element 4. Furthermore, since the areas in which the first electrodes 6a and 6b face the second electrode 6c can be increased in the thermistor element 4 having the CPP structure in the embodiment, it is possible to prevent the resistance value of the thermistor film 5 between the one 6a of the first electrodes and the second electrode 6c and the resistance value of the thermistor film 5 between the second electrode 6c and the other 6b of the first electrodes from becoming excessive.

Also, in the thermistor element 4 in the embodiment, each of the arm portions 12a and 12b (wiring layers) is in contact with the first portion 61 of each of the first electrodes 6a and 6b. On the other hand, the second portion 62 of each of the first electrodes 6a and 6b is disposed between the insulation film 7b provided on each of the arm portions 12a and 12b (wiring layers) and one surface of the thermistor film 5.

Furthermore, as shown in FIG. 4, in the thermistor element 4 in the embodiment, an area of each of the opening portions 20a and 20b (the first portion 61) is smaller than an area of the second portion 62 when viewed in a plan view. Portions of the thermistor film 5 in which the thermistor film 5 and the opening portions 20a and 20b overlap when viewed in a plan view tend to have a poor film quality. Here, in the thermistor element 4 in the embodiment, the area of each of the opening portions 20a and 20b (the first portion 61) is smaller than the area of the second portion 62 when viewed in a plan view. Thus, it is possible to form the thermistor film 5 to have a good film quality.

Moreover, as shown in FIG. 4, in the thermistor element 4 in the embodiment, regions where the pair of first electrodes 6a and 6b is in contact with the thermistor film 5 are located in a region where the second electrode 6c is in contact with the thermistor film 5 when viewed in a plan view.

Thus, even if a variation occurs in the disposition of the first electrodes 6a and 6b in the plane in the thermistor element 4 in the embodiment, the areas in which the first electrodes 6a and 6b face the second electrode 6c do not change. Thus, it is possible to minimize a variation in the resistance value of the thermistor film 5.

Although a case in which the thermistor film 5, the pair of first electrodes 6a and 6b, and the second electrode 6c are formed in a substantially rectangular shape when viewed in a plan view has been exemplified in the embodiment, it is possible to appropriately change the shapes of the thermistor film 5, the pair of first electrodes 6a and 6b, and the second electrode 6c.

Also, the opening portions 20a and 20b are not necessarily limited to the above-described constitutions and can also have, for example, the constitutions as shown in FIGS. 6A to 6C. In addition, it is possible to appropriately change the shape, the disposition, the number, and the like.

To be specific, in the constitution shown in FIG. 6A, the opening portions 20a and 20b are provided in the vicinity of an end portion in a longitudinal direction of a region in which each of the opening portions 20a and 20b and each of the first electrodes 6a and 6b overlap respectively when viewed in a plan view.

On the other hand, in the constitution shown in FIG. 6B, a plurality of (three in the embodiment) opening portions 20a and 20b are provided side by side in a region in which each of the opening portions 20a and 20b and each of the first electrodes 6a and 6b overlap respectively when viewed in a plan view.

Meanwhile, in the constitution shown in FIG. 6C, long opening portions 20a and 20b are provided over most of a region in which each of the opening portions 20a and 20b and each of the first electrodes 6a and 6b overlap respectively when viewed in a plan view.

The method for producing the thermistor element 4 described above will be described below with reference to FIGS. 7 to 14.

FIGS. 7 to 14 are cross-sectional views for sequentially explaining steps of producing the thermistor element 4.

Figure 7:
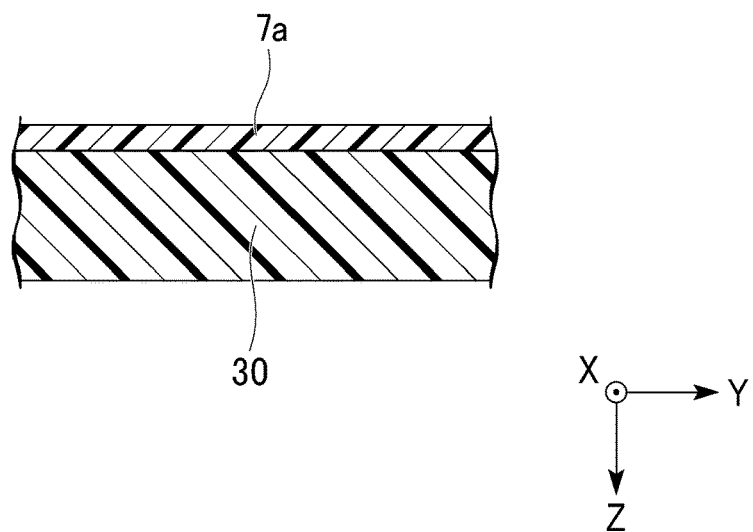
FIG. 7 is a cross-sectional view for sequentially explaining a step of producing a thermistor element shown in FIG. 4.

When the thermistor element 4 is produced, first, as shown in FIG. 7, an insulation film 7a made of, for example, $Al_2O_3$ is formed on an organic material layer 30 over the entire surface.

Figure 8:
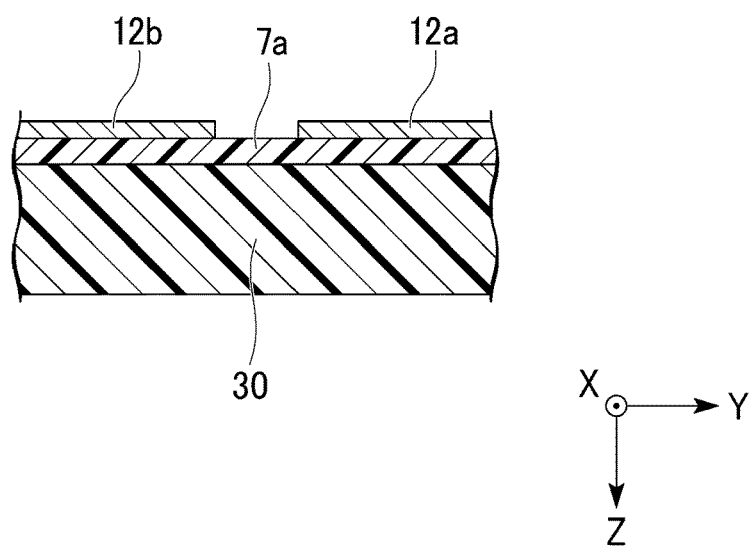
FIG. 8 is a cross-sectional view for sequentially explaining a step of producing a thermistor element shown in FIG. 4.

Subsequently, as shown in FIG. 8, a pair of arm portion 12a and 12b are formed by forming a conductive film 52 made of, for example, Ti on the insulation film 7a over the entire surface and then performing patterning using a photolithography technique to expose a part of the insulation film 7a.

Figure 9:
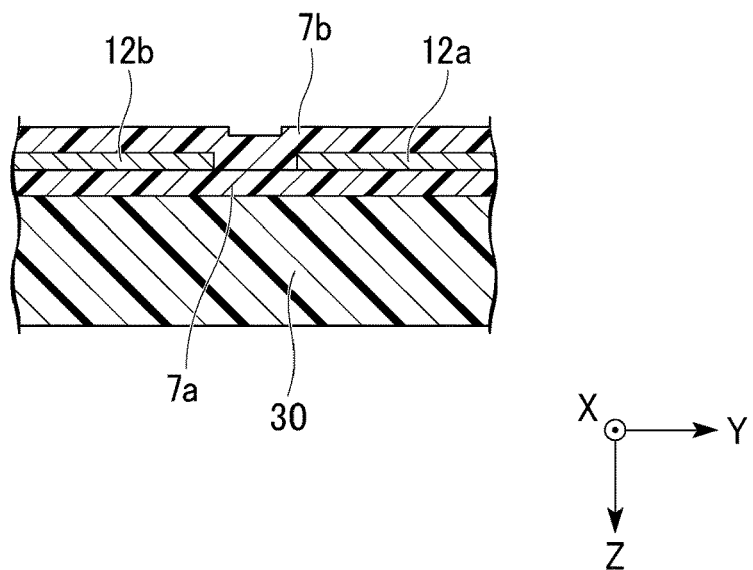
FIG. 9 is a cross-sectional view for sequentially explaining a step of producing a thermistor element shown in FIG. 4.

Subsequently, as shown in FIG. 9, an insulation film 7b made of, for example, $Al_2O_3$ is formed on the pair of arm portion 12a and 12b and exposed portions of the insulation film 7a over the entire surface.

Figure 10:
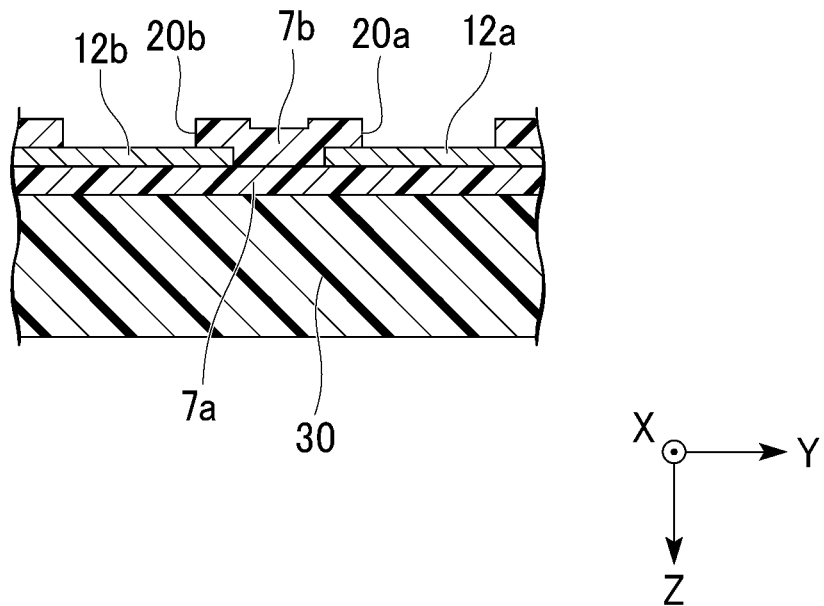
FIG. 10 is a cross-sectional view for sequentially explaining a step of producing a thermistor element shown in FIG. 4.

Subsequently, as shown in FIG. 10, opening portions 20a and 20b passing through the insulation film 7b, respectively, are formed on the pair of arm portion 12a and 12b by performing patterning using a photolithography technique.

Figure 11:
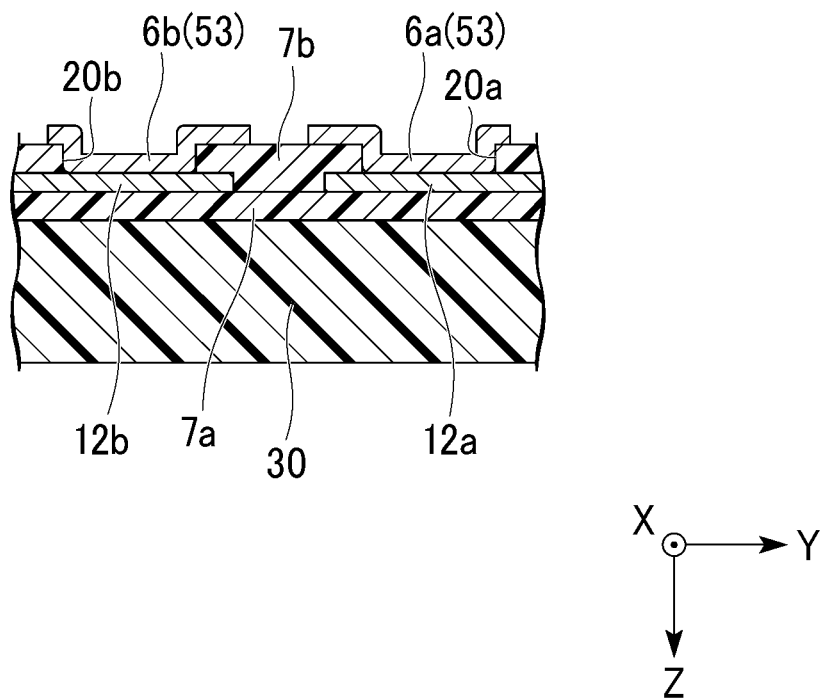
FIG. 11 is a cross-sectional view for sequentially explaining a step of producing a thermistor element shown in FIG. 4.

Subsequently, as shown in FIG. 11, first electrodes 6a and 6b are formed by forming a conductive film 53 made of, for example, Pt on the arm portion 12a and 12b in the opening portions 20a and 20b and the insulation film 7b over the entire surface and then performing patterning using a photolithography technique to expose a part of the insulation film 7b.

Figure 12:
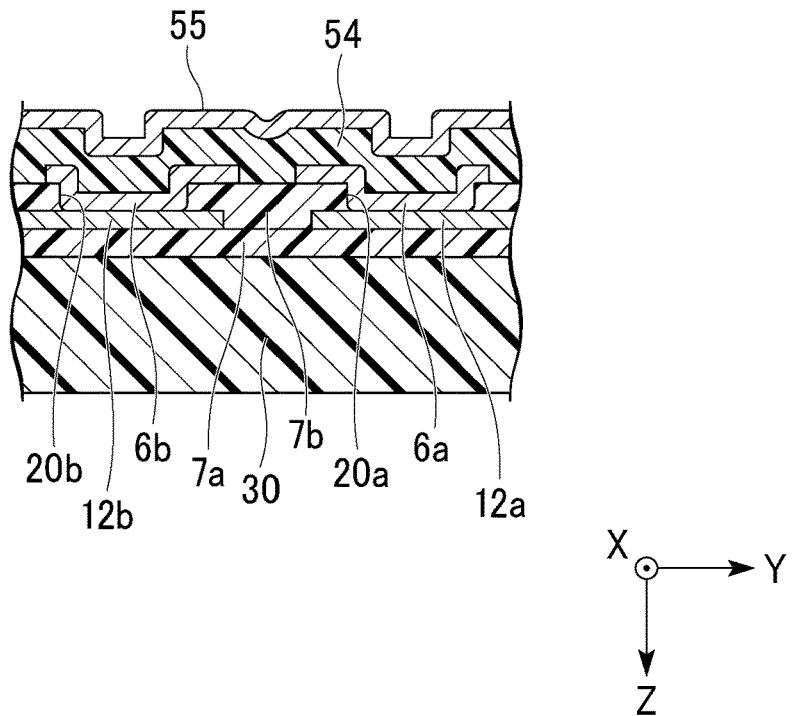
FIG. 12 is a cross-sectional view for sequentially explaining a step of producing a thermistor element shown in FIG. 4.

Subsequently, as shown in FIG. 12, a thermistor material film 54 made of, for example, a Co—Mn—Ni oxide is formed on the first electrodes 6a and 6b and exposed portions of the insulation film 7b over the entire surface and then a conductive film 55 made of, for example, Pt is formed on the thermistor material film 54 over the entire surface.

Figure 13:
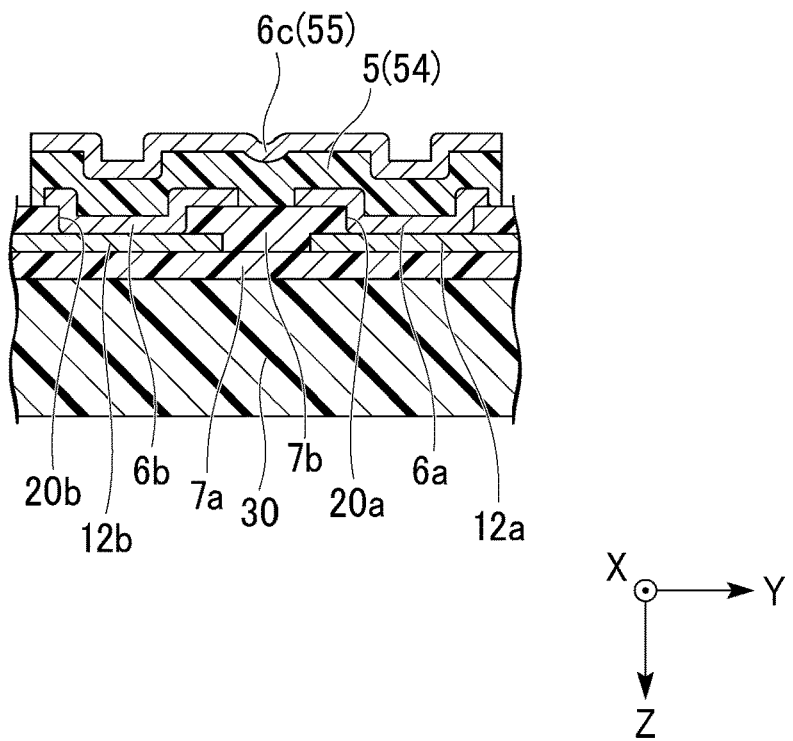
FIG. 13 is a cross-sectional view for sequentially explaining a step of producing a thermistor element shown in FIG. 4.
Figure 14:
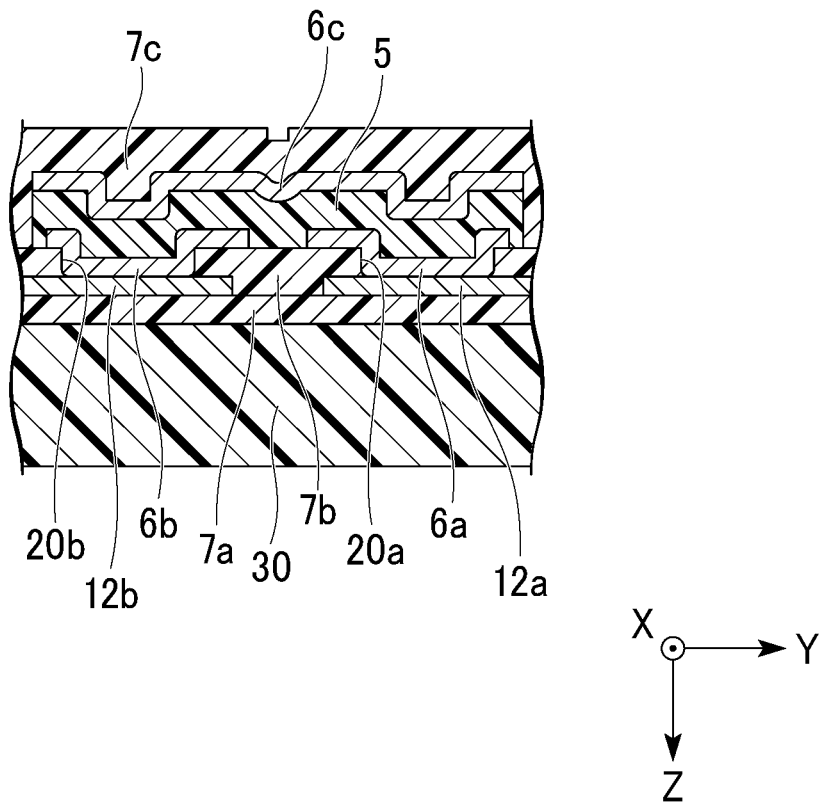
FIG. 14 is a cross-sectional view for sequentially explaining a step of producing a thermistor element shown in FIG. 4.

Subsequently, as shown in FIG. 13, a second electrode 6c and a thermistor film 5 patterned in the same shape as each other are formed by performing patterning using a photolithography technique. After that, heat (annealing) treatment is performed in oxygen.

Subsequently, as shown in HG. 14, an insulation film 7c made of, for example, $SiO_2$ is formed over the entire surface. After that, the organic material layer 30 is removed through ashing. It is possible to prepare the thermistor element 4 described above through the above steps.

The present disclosure is not necessarily limited to that of the above embodiment. In addition, various modifications are possible without departing from the gist of the present disclosure.

Figure 15:
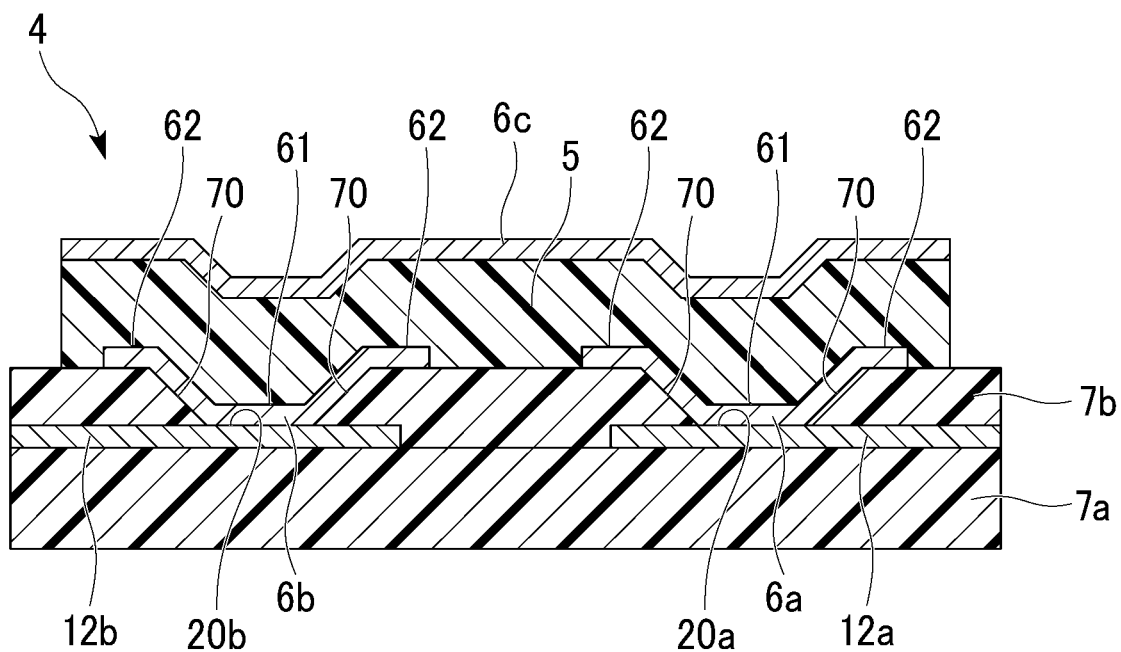
FIG. 15 is a cross-sectional view showing another constitution of the thermistor element.

For example, the insulation film 7b surrounding the opening portions 20a and 20b described above is formed of a surface perpendicular to a film surface in the thermistor element 4 described above. Here, for example, as shown in FIG. 15, the insulation film 7b surrounding the opening portions 20a and 20b may be formed of an inclined surface 70.

Also in this case, it is possible to increase contact areas between the first electrodes 6a and 6b and the thermistor film 5 and it is possible to improve the reliability of the thermistor element 4. Furthermore, it is possible to prevent the resistance value of the thermistor film 5 between the one 6a of the first electrodes and the second electrode 6c and the resistance value of the thermistor film 5 between the second electrode 6c and the other 6b of the first electrodes from becoming excessive.

Figure 16:
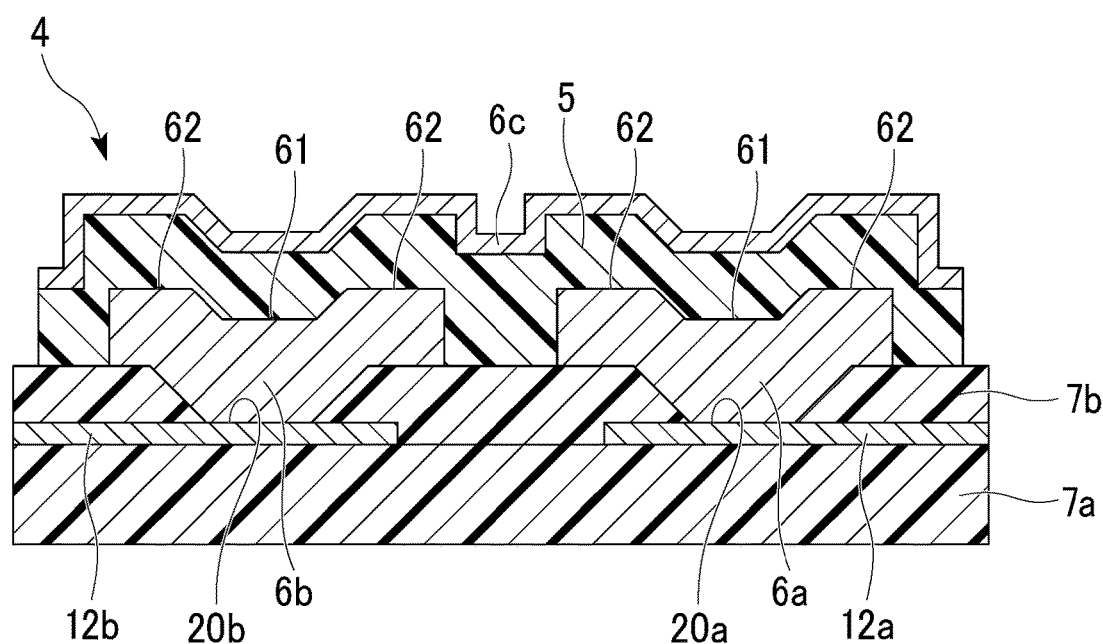
FIG. 16 is a cross-sectional view showing another constitution of the thermistor element.

Furthermore, in the thermistor element 4 described above, a thickness of the first portion 61 of the first electrodes 6a and 6b described above is smaller than a thickness of the insulation film 7b surrounding the opening portions 20a and 20b. Meanwhile, as shown in FIG. 16, the thickness of the first portion 61 of the first electrodes 6a and 6b may be formed to be larger than the thickness of the insulation film 7b surrounding the opening portions 20a and 20b.

Moreover, although the thermistor element 4 described above has the CPP structure, the thermistor element 4 may be formed to have the CIP structure in which there is no second electrode 6c. Also in this case, it is possible to increase contact areas of the first electrodes 6a and 6b and the thermistor film 5 and it is possible to improve the reliability of the thermistor element 4.

The electromagnetic wave sensor to which the present disclosure is applied is not necessarily limited to the constitution of the infrared image sensor in which the plurality of thermistor elements 4 described above are arranged in an array form. In addition, the present disclosure can also be applied to an electromagnetic wave sensor in which a thermistor element 4 alone is used, an electromagnetic wave sensor in which a plurality of thermistor elements 4 are arranged side by side in a linear form, and the like. Furthermore, it is also possible to use a thermistor element 4 is used as a temperature sensor configured to measure a temperature.

Also, the electromagnetic wave sensor to which the present disclosure is applied is not necessarily limited to the sensor configured to detect the infrared rays described above as electromagnetic waves and may be, for example, a sensor configured to detect terahertz waves having a wavelength of 30 µm or more and 3 mm or less.

What is claimed is:

1. A thermistor element, comprising:
   a thermistor film;
   a pair of first electrodes provided in contact with one surface of the thermistor film;
   an insulation film positioned in a location opposite to a contact side of the pair of first electrodes, the contact side being a side on which the pair of first electrodes is in contact with the thermistor film; and
   at least one opening portion located in a region which overlaps each of the first electrodes when viewed in a plan view and passing through the insulation film,
   wherein each of the first electrodes has a first portion located in a region in which each of the first electrodes and the opening portion overlap when viewed in a plan view and a second portion located outside of the region in which each of the first electrodes and the opening portion overlap when viewed in a plan view,
   each of the first electrodes is provided over the first portion and the second portion to be in contact with the one surface of the thermistor film,
   each of the first electrodes is a single layer, and
   a part of each of the first electrodes is provided in the opening portion.

2. The thermistor element according to claim 1, further comprising:
   a wiring layer electrically connected to each of the first electrodes,
   wherein the wiring layer is provided in contact with the first portion.

3. The thermistor element according to claim 2, wherein the wiring layer is made of at least one selected from the group consisting of aluminum, tungsten, titanium, tantalum, titanium nitride, tantalum nitride, chromium nitride, and zirconium nitride.

4. The thermistor element according to claim 1, further comprising:
   a second electrode provided in contact with the other surface of the thermistor film.

5. The thermistor element according to claim 1, wherein an area of the opening portion is smaller than an area of the second portion when viewed in a plan view.

6. An electromagnetic wave sensor, comprising:
   the thermistor element according to claim 1.

7. The electromagnetic wave sensor according to claim 6, wherein a plurality of the thermistor elements is arranged in an array form.

8. A thermistor element, comprising:
   a thermistor film;
   a pair of first electrodes provided in contact with one surface of the thermistor film;
   an insulation film positioned in a location opposite to a contact side of the pair of first electrodes, the contact side being a side on which the pair of first electrodes is in contact with the thermistor film; and
   at least one opening portion located in a region which overlaps each of the first electrodes when viewed in a plan view and passing through the insulation film,
   wherein each of the first electrodes has a first portion located in a region in which each of the first electrodes and the opening portion overlap when viewed in a plan view and a second portion located outside of the region in which each of the first electrodes and the opening portion overlap when viewed in a plan view,
   each of the first electrodes is provided over the first portion and the second portion to be in contact with the one surface of the thermistor film,
   a part of the thermistor film is provided in the opening portion, and
   a part of each of the first electrodes is provided between a side surface of the opening portion and the thermistor film provided in the opening portion.

9. The thermistor element according to claim 8, further comprising:
   a wiring layer electrically connected to each of the first electrodes,
   wherein the wiring layer is provided in contact with the first portion.

10. The thermistor element according to claim 9, wherein the wiring layer is made of at least one selected from the group consisting of aluminum, tungsten, titanium, tantalum, titanium nitride, tantalum nitride, chromium nitride, and zirconium nitride.

11. The thermistor element according to claim 8, further comprising:
    a second electrode provided in contact with the other surface of the thermistor film.

12. The thermistor element according to claim 8, wherein an area of the opening portion is smaller than an area of the second portion when viewed in a plan view.

13. An electromagnetic wave sensor, comprising:
    the thermistor element according to claim 8.

14. The electromagnetic wave sensor according to claim 13, wherein a plurality of the thermistor elements is arranged in an array form.

* * * * *